Nov. 11, 1941.   H. D. RALSTON   2,262,250
ADDRESSING MACHINE
Filed Aug. 3, 1939   7 Sheets-Sheet 3

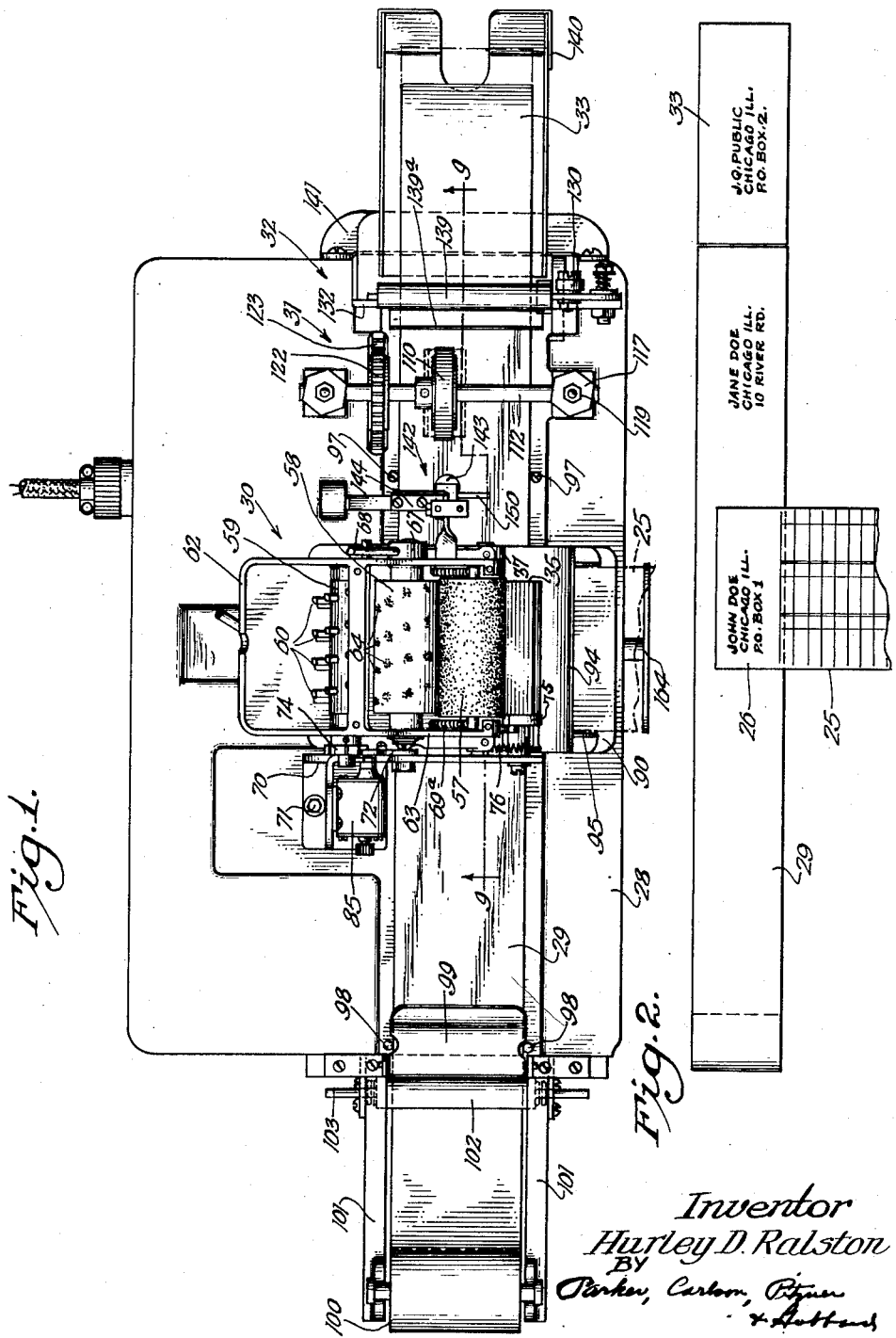

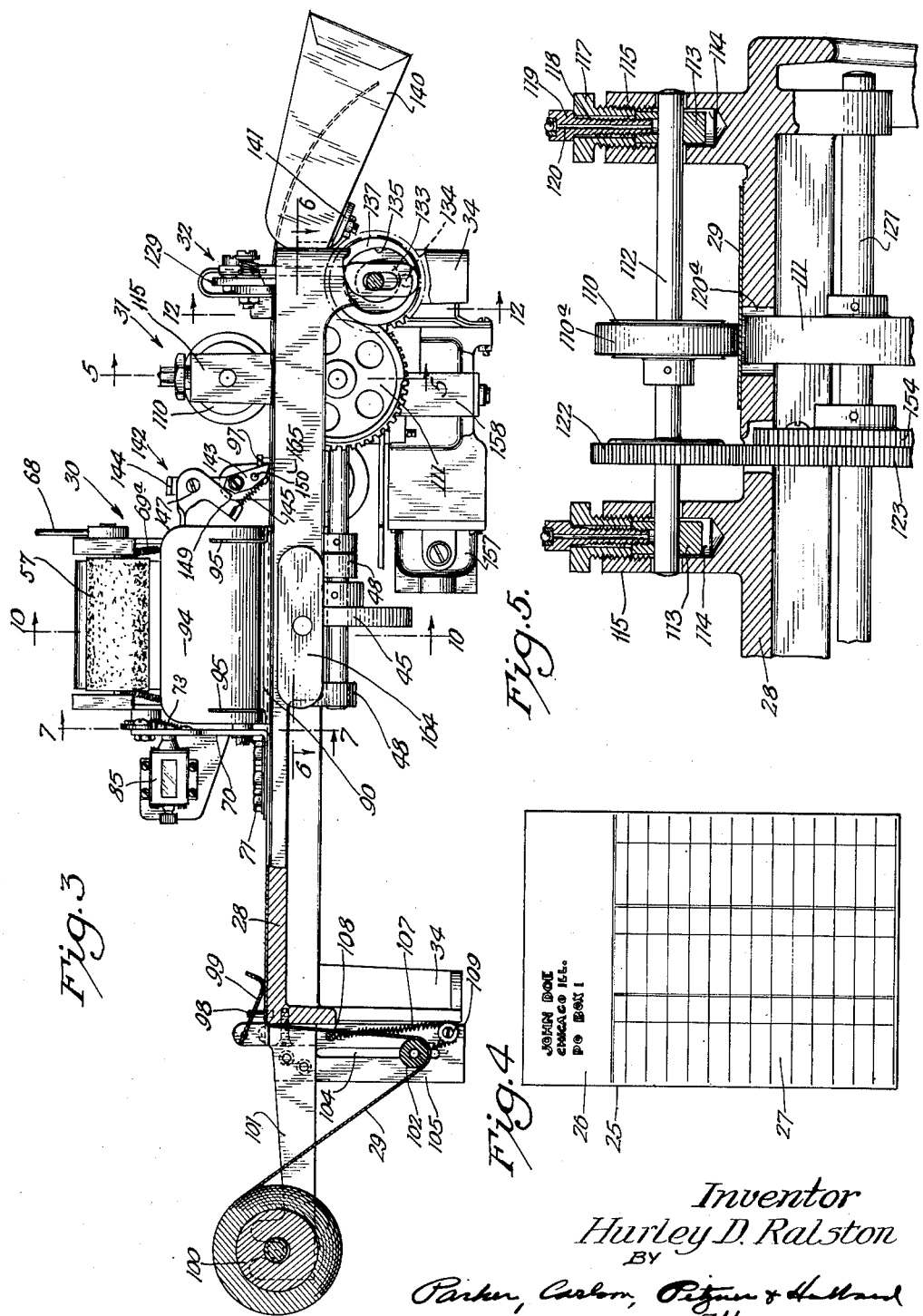

Inventor
Hurley D. Ralston
By Parker, Carlson, Pitner
& Hubbard
Attorneys.

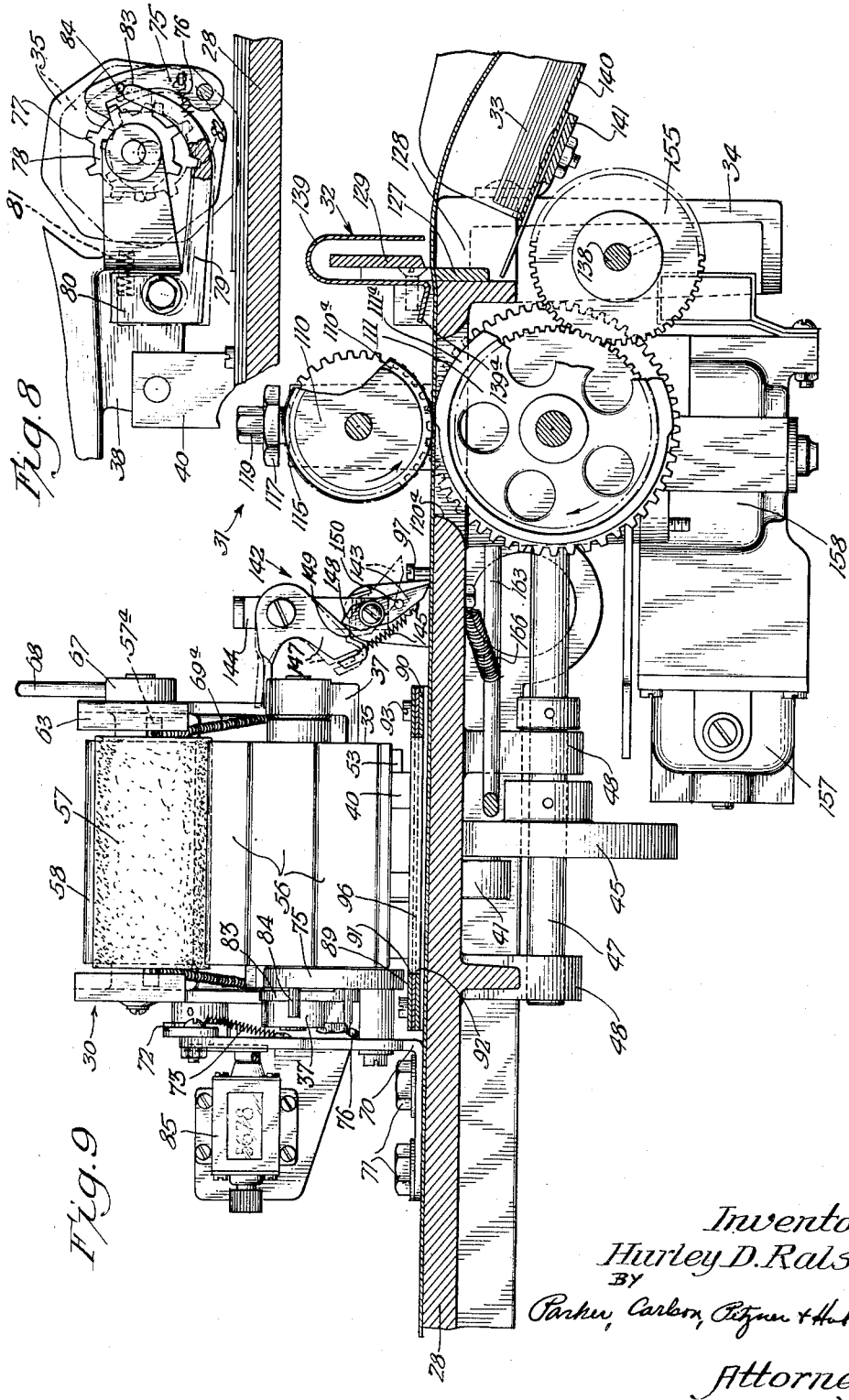

Nov. 11, 1941.  H. D. RALSTON  2,262,250
ADDRESSING MACHINE
Filed Aug. 3, 1939  7 Sheets-Sheet 5
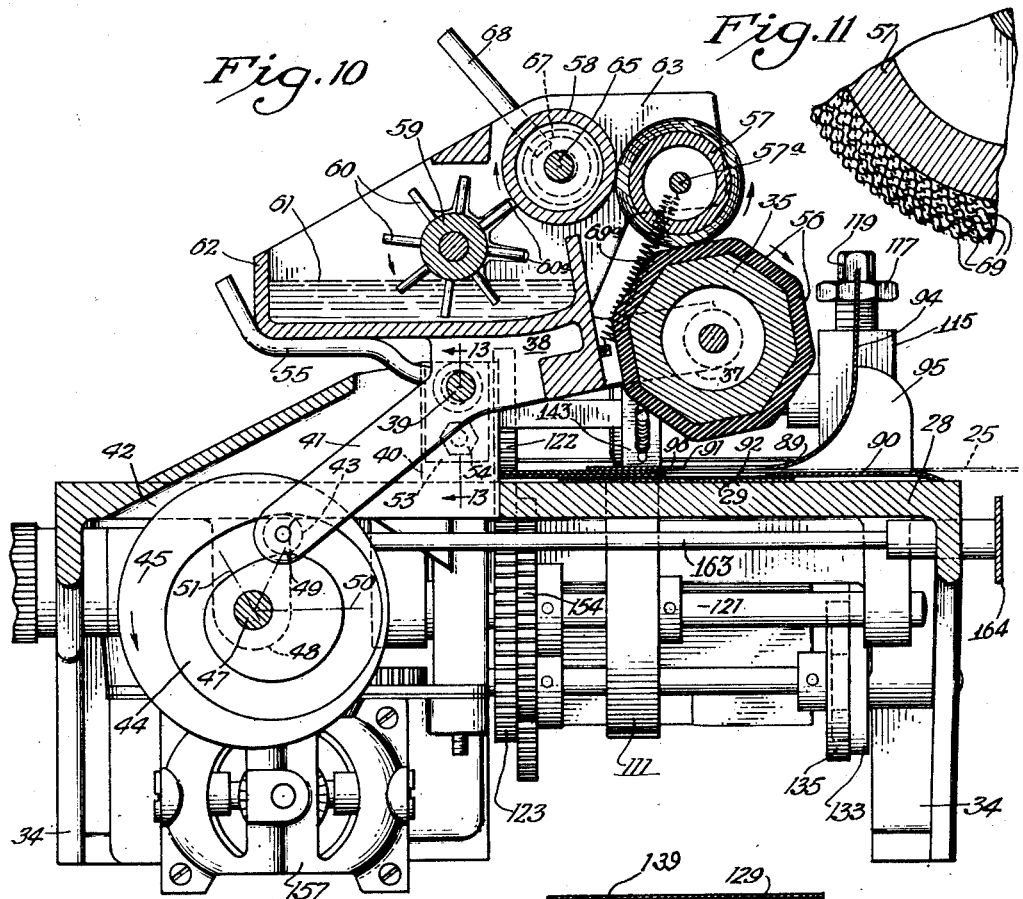
Fig. 10
Fig. 11
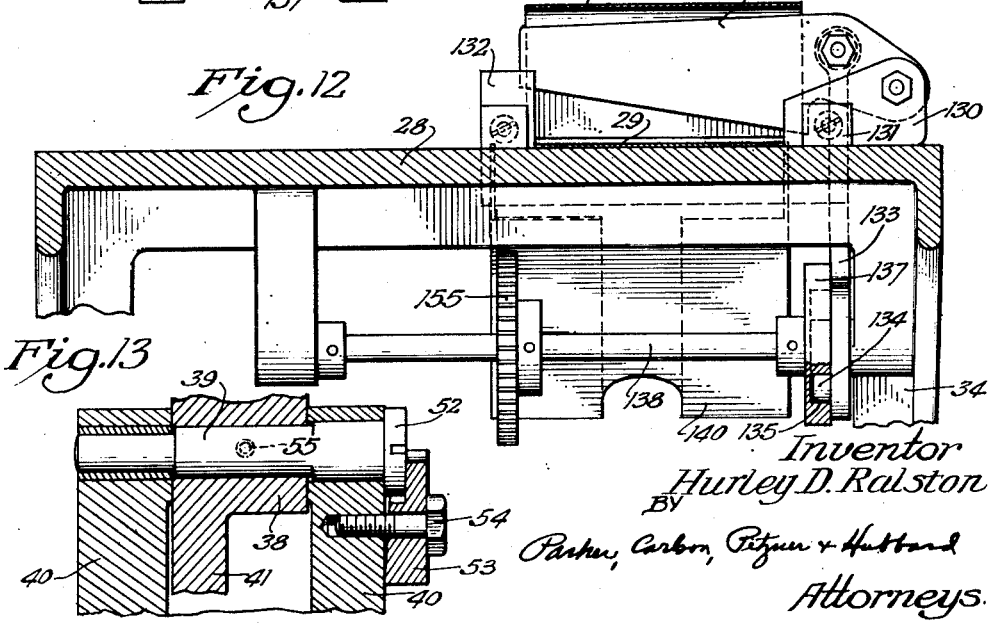
Fig. 12
Fig. 13
Inventor
Hurley D. Ralston
By
Parker, Carlson, Pitzner & Hubbard
Attorneys Nov. 11, 1941.                H. D. RALSTON                    2,262,250
                            ADDRESSING MACHINE
                       Filed Aug. 3, 1939        7 Sheets-Sheet 6
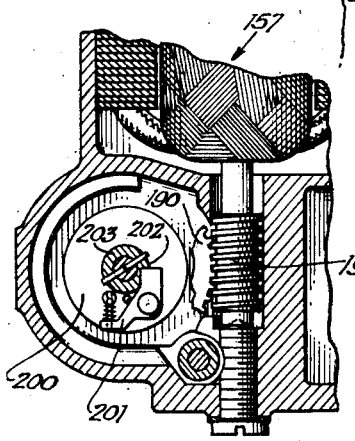
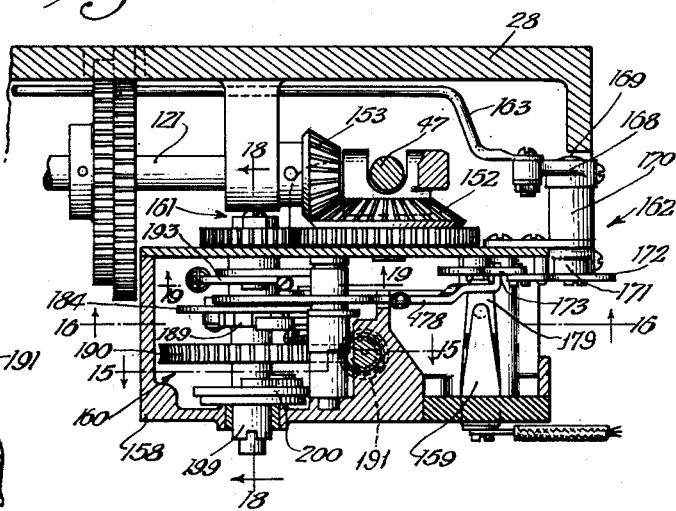
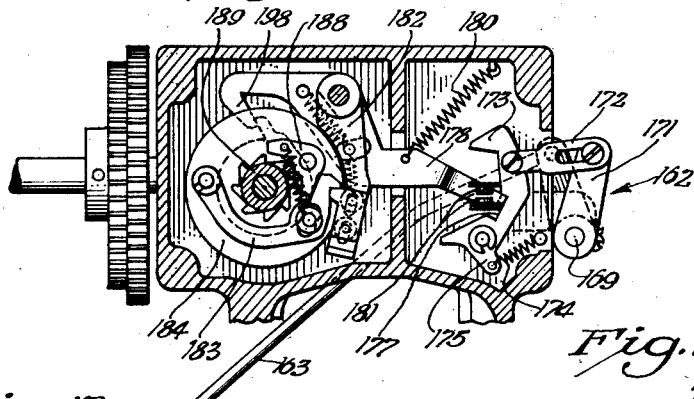
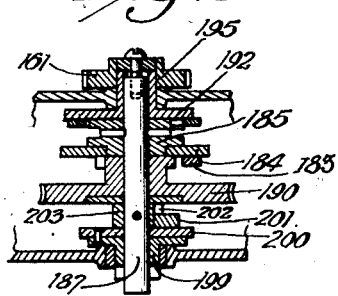
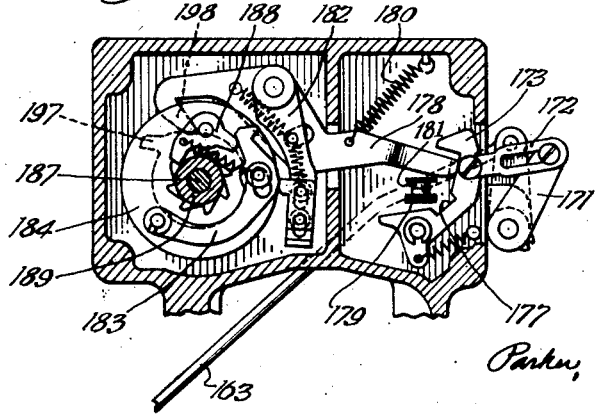
Inventor
Hurley D. Ralston
BY
Parker, Carlson, Pitzner + Hubbard
Attorneys.

Nov. 11, 1941.  H. D. RALSTON  2,262,250
ADDRESSING MACHINE
Filed Aug. 3, 1939  7 Sheets-Sheet 7

Inventor
Hurley D. Ralston
BY
Parker, Carlson, Pitzner & Hubbard
Attorneys.

Patented Nov. 11, 1941

2,262,250

UNITED STATES PATENT OFFICE 2,262,250

ADDRESSING MACHINE

Hurley D. Ralston, Oak Park, Ill., assignor to Sears, Roebuck and Co., Chicago, Ill., a corporation of New York Application August 3, 1939, Serial No. 288,066

23 Claims. (Cl. 101—48)

This invention relates to improvements in addressing machines and more particularly concerns a machine adapted to address labels, envelopes, or the like.

A general object of the invention is to provide a machine of the foregoing general character which performs rapidly and efficiently, is capable of large production, is simple to operate and easy to maintain in proper working order, and which can be constructed and run at low cost.

Another object is to provide a selectively operable machine for producing stencil-printed labels.

These labels may be of the kind which are used in addressing mail matter such as catalogues, circulars and the like. A mailing list from which the labels are prepared may be embodied in a more or less permanent file upon a series of separate cards which have an address stencil at one end of a body containing a record that will show whether or not the individual represented is entitled to receive the catalogue or other matter to be distributed. By glancing at each record card in order, a clerk can therefore judge whether a label is to be prepared for the individual represented thereby and may feed the selected card to the machine for preparation of the corresponding labels.

In this connection it is still another object of the invention to provide a machine to which the stencil portions of the selected record cards can be fed successively without disturbing the sequence of the card files.

A further object of the invention is to provide a machine for producing stenciled labels in succession upon a continuous ribbon of label paper which may be severed to form individual labels.

Yet another object of the invention resides in the provision of improved mechanism for impressing the ink through the stencils in preparing the labels, such inking mechanism being adapted to operate with a high degree of uniformity and being equipped for unusually thorough, adjustably regulated ink distribution to the impression means thereof.

A still further object of the invention is to provide a machine of this character adapted for controlled cyclical operation and having a high speed driving mechanism operable with a low power expenditure.

Other objects and advantages will become apparent from the following description taken in connection with the accompanying drawings, in which:

Figure 1 is a plan view of an addressing machine embodying the principles of the invention.

Fig. 2 is a diagrammatic view demonstrating the steps in the production of the stenciled labels.

Fig. 3 is a front elevational view of the machine with parts broken away and in section for clarity of illustration.

Fig. 4 is a face view of a preferred form of stencil record card with which the machine is particularly adapted to be used.

Fig. 5 is a vertical sectional elevational view taken substantially along line 5—5 of Fig. 3 and showing details of the feeding means for the label ribbon.

Fig. 8 is a view taken in the same plane as Fig. 7 but showing the parts in different positions in the cycle of operation.

Fig. 9 is a longitudinal vertical sectional view through the machine taken in substantially the plane of line 9—9 of Fig. 1.

Fig. 10 is a transverse vertical sectional view taken substantially in the plane of line 10—10 of Fig. 3 showing the inking mechanism and driving means therefor.

Fig. 11 is a fragmentary enlarged sectional detail view showing a segment of the inking roller.

Fig. 12 is a transverse vertical sectional view taken substantially in the plane of line 12—12 of Fig. 3 to show details of the ribbon cut-off means.

Fig. 13 is a fragmentary vertical sectional view taken substantially along line 13—13 of Fig. 10 showing details of the pressure adjusting means of the inking mechanism.

Fig. 14 is a vertical sectional view taken substantially along line 14—14 of Fig. 6 and showing details of the one-revolution transmission and motor controlling means.

Fig. 15 is a fragmentary horizontal sectional view taken substantially along line 15—15 of Fig. 14.

Fig. 16 is a horizontal sectional view taken in substantially the plane of line 16—16 of Fig. 14.

Fig. 17 is a fragmentary sectional view taken in the same plane as Fig. 16 but showing the working parts in different positions.

Fig. 18 is a fragmentary vertical sectional view taken in substantially the plane of line 18—18 of Fig. 14.

Figure 6:
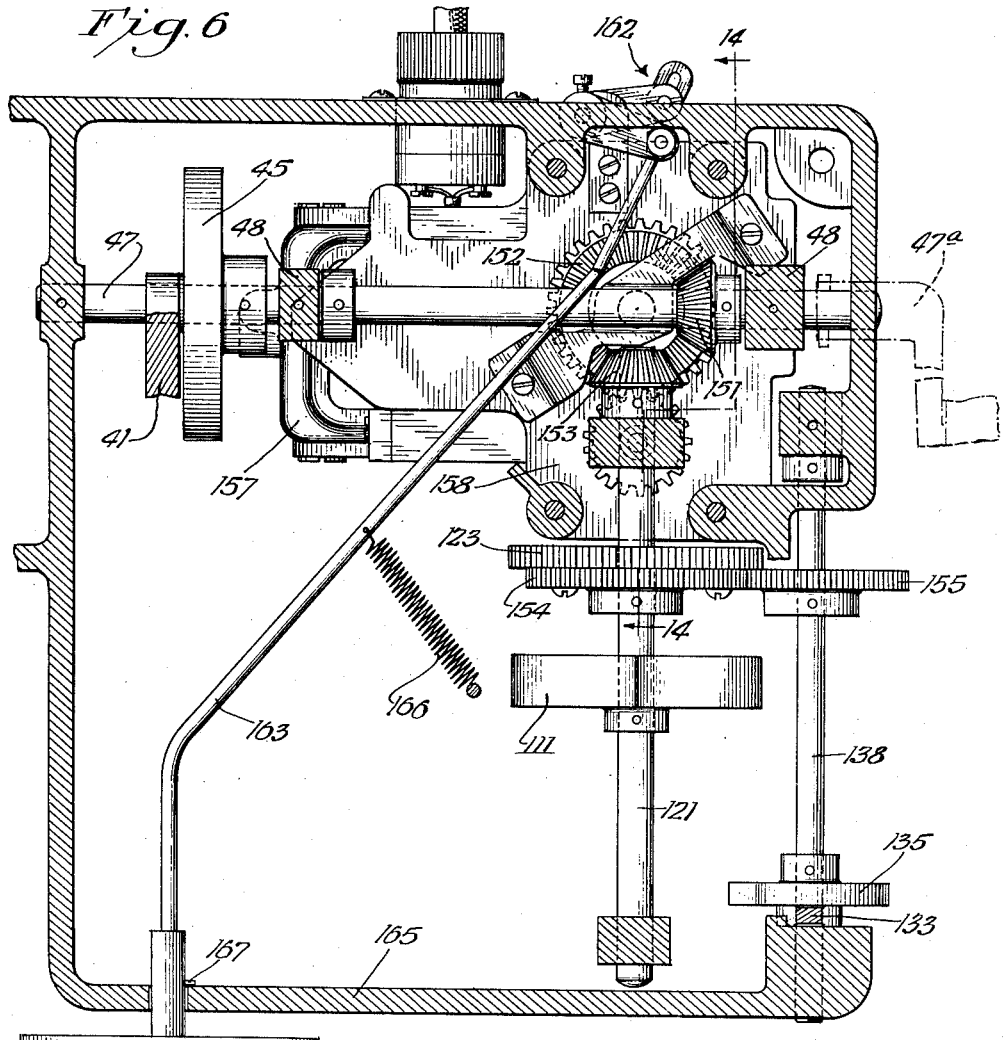
Fig. 6 is a horizontal sectional view taken substantially along line 6—6 of Fig. 3 and showing details of the driving mechanism and operation controlling means.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

The present invention is particularly adapted for use with stencil record cards 25 (Figs. 2 and 4) formed of a suitable material such as manilla board. Each card may include an address portion 26 in the form of an integral stencil at one end of a record-containing body portion 27 upon which may be inscribed information as to the standing or activities of the person whom the particular card represents. For example, the respective record portions 27 may contain information as to the purchases made by the customers of a commercial enterprise such as a mail order house. Thus, by reference to the record portions 27 of customer-card files, the customers can be selected or classified for such purposes as receiving various types of mail matter. By way of illustration, the record portions 27 may be referred to upon the issuance of a new catalogue for determining whether the respective customers' purchases over a given period warrant the expense of sending them copies of the new issue as a matter of course. Thereupon, the addresses for the catalogues can be prepared on suitable labels by means of the stencil portions 26.

According to the present invention, preparation of such labels is effected rapidly and accurately without disturbing the orderly sequence of the card files. A label corresponding to each selected card is stenciled by removing the card from its file, placing the address portion 26 between a piece of label paper and appropriate means which impresses ink through the stencil onto the paper, and the card is then returned to its place in the file. A machine for this purpose may comprise a suitable base such as a table 28 (Figs. 1 and 3) across which a ribbon 29 of gummed or ungummed label paper extends to have imprinted thereon a succession of stenciled addresses by the operation of an inker 30 that is movably mounted to impress ink onto the paper through the selectively interposed stencil portions 26 of the record cards. After each successive address is imprinted thereon, the ribbon 29 is advanced longitudinally one label length as by roller means 31. Cut-off means 32 may sectionally sever the printed end portions of the ribbon into individual labels 33 (Figs. 1, 2 and 9).

The table 28 may be formed as an elongated, one-piece cast frame having pairs of legs 34 at the opposite ends by which it may be mounted upon a suitable supporting stand or table. Longitudinally the table is preferably dimensioned to extend substantially beyond both sides of the inker 30 which may be located centrally thereon.

Figure 7:
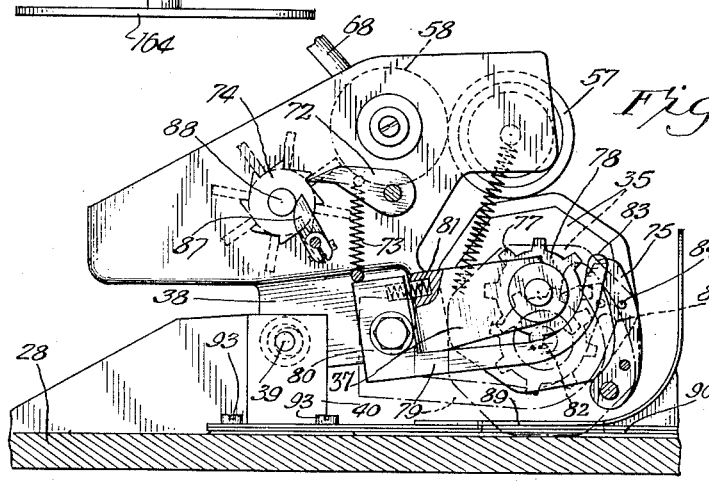
Fig. 7 is a transverse vertical sectional view taken substantially in the plane of line 7—7 of Fig. 3 and showing details of the roller operating means for the inking mechanism.

In the present instance, the inker 30 is of the type wherein ink is spread uniformly in proper amount upon an inked impression roller which is adapted to be pressed against the stencil. As shown (Figs. 1, 9 and 10) the inker includes an impression roller 35 which is of a length substantially corresponding to the width of the stencil card 25 and is mounted rotatably on an axis parallel to the table 28 between a pair of journal arms 37 that project forwardly from a rocker carriage 38. By means of an axis pin 39 the carriage is connected pivotally for rocking movement between a pair of spaced parallel upstanding journal bosses 40 upon the table (Figs. 7 and 10). Rocking motion of the carriage to carry the inked impression roller 35 toward and away from the label ribbon, is effected by an integral rocker arm 41 which extends rearwardly and downwardly from the carriage through an opening 42 in the table. A follower roller 43 on the rocker arm is adapted to ride within a cam groove 44 formed in one face of a rotatable cam disk 45. Rotatable support for the cam disk is furnished by a shaft 47 suitably journaled within brackets 48 depending from the under face of the table 28 (Figs. 6, 9 and 10).

Preferably, the design of the cam groove 44 is such as to effect a complete cycle of rocking movement of the carriage 38 in each full revolution of the disk 45. The cycle commences with the impression roller 35 in an initial or starting position as closely spaced from the table 28 as practicable so as to require only a minimum of time for movement in the impression or imprinting stroke of the inker which carries the roller into imprinting position upon the work. The cycle is then completed by reversing the rocking motion of the carriage and raising the impression roller 35 first to a point higher than the starting position (for purposes to be hereinafter more fully described) and then dropping the carriage to the starting position. For this purpose the cam groove 44 has what may be considered as three principal operating points determined by the respective radial distances of the groove from the axis of the cam disk. Thus, in the starting position, the cam follower 43 will be at a point 49 (Fig. 10) located at an intermediate distance from the cam disk axis. From such point the follower is guided, in the counterclockwise rotation of the cam disk as seen in Fig. 10, rapidly but smoothly outwardly from the axis to a point 50 located farthest from the disk axis and determinative of the imprinting position of the carriage. Thence, the cam groove shape is such as to guide the follower gradually inwardly to a point 51 where the carriage is raised highest from the table. From this point, the contour of the cam groove 45 guides the follower outwardly to the starting point 49. As a result of this arrangement, rocking of the inker carriage is effected smoothly and gently yet rapidly, the imprinting stroke being rapid and without impact of the inking roller, and the interval of transition from the impression to the return stroke allows sufficient time for thorough delivery of the ink through the stencil onto the work.

By slight adjustments of the spacing between the impression roller 35 and the table 28 in the starting position of the inker, control may be had over the pressure with which the roller presses against the work. To this end a suitable expedient may consist in having the axis pin 39 fashioned eccentrically (Figs. 10 and 13) so that the necessary adjustment may be effected by selective rotation thereof. For convenience in effecting adjustment, one end of the axis pin may be provided with a head 52 formed to be engaged by a suitable tool such as a screw driver. Means for locking the axis pin 39 in any adjusted position may comprise a grooved pressure block 53 which fits over at least a portion of the head 52 and is suitably secured in rigid gripping relation thereto as by means of a bolt 54 threaded into the adjoining boss 40. Oil for lubricating the interface bearing surfaces of the carriage and axis pin may be supplied through a duct 55.

The impression roller 35 is preferably of the type having a resilient pressure surface formed of suitable material such as rubber and is in the present instance of an improved construction adapting the same to cover uniformly a relatively large area upon being applied with relatively light pressure. To this end, the roller is preferably formed with a plurality of relatively flat peripheral impression faces 56 (Figs. 9 and 10), herein shown as eight in number. As a result, when any of the impression faces 56 is uniformly coated with ink and impressed flatwise against the surface of the work, a correspondingly uniform application of ink will occur.

Improved means is provided for applying the ink to the impression faces 56 with a high degree of uniformity both as to quantity and distribution. As seen to best advantage in Fig. 10, an inking roller 57 is mounted for direct contact with the impression faces 56 and receives ink from a transfer roller 58 to which ink is delivered by a rotary distributor 59. The latter is constructed in the form of a relatively thin roll having a plurality of longitudinal rows of radial, blunt-end ink distributing pins 60 spaced equidistantly about the circumference thereof and adapted in the rotation of the distributor to dip into a body of ink 61 carried within an inkwell 62 formed upon the upper part of the carriage 38. There are preferably the same number of rows of the pins 60 as there are impression faces 56 on the impression roller. Both the transfer roller 58 and the distributor 59 are preferably mounted between and have their axis shafts journaled in spaced parallel relation in a pair of spaced parallel side wall wings 63 which project vertically from the carriage 38. The transfer roller is located somewhat above and to one side of the distributor, and the spacing between this roller and the distributor is such that the blunt ends of the inking pins 60 will sweep in spaced relation past the periphery of the roller. Through this arrangement, a relatively viscous liquid ink may be used which clings to the pins and tends to form a droplet or bead 60ᵃ projecting from the end of each pin as the later sweeps out of the ink body 61 toward the surface of the transfer roller. Thereupon, as the ink loaded ends of each of the rows of pins 60 come into the most closely approaching relation to the periphery of the transfer roller 58, the ink beads 60ᵃ will bridge the gap and adhere to the surface of the roller. Thus, by relatively rotating the transfer roller 58 and the distributor 59, it will be observed that a peripheral succession of spots of ink 64 (Fig. 1) will be distributed upon the surface of the transfer roller. To assure uniformity of ink distribution, the distributor pins 60 in each row are preferably located in staggered relation to the pins of adjacent rows so that, considered circumferentially of the distributor, the pins are in a spiral arrangement. As a result, the ink spots are applied to the transfer roller in a uniformly distributed pattern. By preference the transfer roller 58 is formed of suitable non-corrosive metal such as brass and has its ink-receiving periphery finished relatively smooth.

The viscosity and pigmentation of the ink may vary from time to time so that the ink beads 60ᵃ may vary in size. Moreover, it may be desirable for various reasons to adjust the amount of ink to be delivered to the transfer roller. Therefore, means is provided for adjusting the gap between the transfer roller 58 and the ends of the distributor pins 60 to control the amount of ink taken from the ink beads 60ᵃ. Herein such means may be associated with the transfer roller 58 so that the latter may be shifted relative to the ends of distributor pins 60. Thus, the transfer roller may be journaled upon an eccentric shaft 65 which has a knob 67 projecting beyond the outer face of one of the side wings 63 (Figs. 1, 9 and 10). By rotating the knob 67 as by means of a convenient handle 68 the transfer roller can be shifted toward or away from the orbit described by the ends of the distributor pins.

In order to secure the best practicable uniformity of ink distribution thereover, the inking roller 57 is preferably equipped with an absorbent covering upon which the ink spots 64 transferred thereto will spread and become uniformly diffused by capillarity. This absorbent covering is preferably formed of a plurality of layers 69 of woven cotton cloth wrapped circumferentially about the roller (Figs. 10 and 11). Cotton cloth has important advantages over felt, which has heretofore been used for this purpose, in that it seems not to act as a filter for the ink pigment as is the case with felt, but on the contrary has been found to have the quality of effecting an unusually thorough and uniform capillary distribution of the ink pigment for full-bodied transfer to the impression roller 35. There is also a decidedly lesser tendency toward clotting or gumming. Further assistance in attaining uniformity of ink distribution is attained by constructing the inking roller 57 of slightly larger diameter than the transfer roller 58; so that as these rollers rotate relatively, the points at which the spots of ink 64 impinge the inking roller will progressively shift circumferentially until in the course of a few revolutions substantially the entire surface of the inking roller will have received direct applications of the ink spots 64.

Rotation of the inking roller 57 is effected by rotation of the impression roller 35 with which it is maintained in yieldable bearing contact by means such as contractile tension springs 69ᵃ. These springs are anchored to the carriage 38 behind the impression roller and to the axially protruding ends of a shaft 57ᵃ for the inking roller, and are tensioned to pull such roller against the impression faces 56 with just sufficient pressure to assure that a proper amount of ink will be squeezed out of the inking cloth layer 69 and applied to such faces. The springs 69ᵃ also hold the inking roller in bearing engagement against the transfer roller 58 to effect rotation of the latter and assure absorption of the ink spots 64 therefrom. To permit freedom of lateral movement of the inking roller as it travels over the humps between the impression faces 56, the ends of the shaft 57ᵃ are left free and merely confined within axial limits by the flat forwardly projecting vertical ends of the wings 63. A suitable cover (not shown) may be removably secured over the inking and transfer rollers and the inkwell 62.

In the present instance, rotation of the several rollers of the inker is effected as an incident to the rocking motions of the carriage 38. To this end, means is provided upon the table 28 (Figs. 1, 7, 8 and 9) which will effect rotation of the distributor 59 during the imprinting stroke of the inker, and other means is provided for rotating the impression roller 35 during the return stroke of the inker. Thus, an angular bracket 70 is secured to the table 28 as by means of bolts 71 adjacent to one side of the inker, herein at the left when facing the machine. Upon this bracket is mounted a pawl 72 which is held by a tension spring 73 yieldably in engagement with the teeth of a suitable ratchet 74 secured to the adjacent outwardly projecting end of the distribtuor shaft. In each imprinting stroke of the inker, the pawl 72 advances the ratchet sufficiently to bring a succeeding row of distributor pins 60 into endwise adjacent relationship to the transfer roller 58. Also as an incident to each imprinting stroke, an upstanding catch arm 75 (Fig. 7), tensioned by a spring 76 and pivoted upon the bracket 70, enters into engagement with a succeeding cog 77 of a cog wheel 78 which is fixedly secured to the adjacent end of the impression roller 35 (see the dot dash outline in Fig. 7). Then, as the carriage moves upwardly the catch acts to pull the cog wheel around and effects a one-face advance of the impression roller. Herein there is a cog 77 corresponding to each of the impression faces 55.

To avoid overrunning of the impression roller 35 and to assure true alinement of the successive impression faces 56 for impressing flatwise against the work, suitable means such as a releasable locking lever 79 is provided to cooperate with the cogs 77. The lever underlies the cog wheel 78 and at its rear end has a heel portion 80 which is pivotally connected to the carriage 38. A spring 81 bearing against the heel 80 normally urges the lever toward engagement with the cog wheel 78 so that lowermost cog 77 will be received in a socket notch 82 formed in the lever. When thus engaged, the cog wheel 78 is held substantially immovable until the locking lever is rocked in opposition to the spring 81 to enable the engaged cog 77 to clear the socket notch 82. Herein the release is accomplished contemporaneously with the action by which a succeeding cog 77 is engaged and turned by the catch 75 for advancing the impression roller. Accordingly, the lever is provided with an upturned tip 83 which engages a pin 84 carried by the catch 75 and adapted to move into tip-engaging position at the completion of the imprinting stroke of the inker (dot dash position Fig. 7). Then as the inker commences to rise on the return stroke, engagement of the tip 83 against the pin 84 begins to effect release of the lever (dot dash position Fig. 8). As the inker continues to rise such engagement persists for an interval sufficient to release the lever fully and enable rotation of the cog wheel until the engaged cog 77 has cleared the socket notch 82 and another cog 77 is located for reception therein. Thereupon the tip 83 slips out of engagement with the pin 84 and permits the lever 79 to snap into the cog-holding relationship. It is primarily to accommodate this action that the inker carriage 38 is caused to move above the initial or starting position, wherein the impression roller 35 is poised for rapid, almost instantaneous, contact with the work in the printing stroke.

If desired, a counter 85 (Figs. 1, 3 and 9) may be mounted upon the bracket 70 and may have a rockable operating cam finger 87 (Fig. 7) in engagement with a knob 88 which projects axially from the ratchet 74. Thus, during each rocking movement of the inker, the cam finger 87 will be rocked to operate the counter.

Suitable means is provided for convenience in properly locating the stencils under the impression roller 35. As shown (Figs. 1, 3, 7 and 10) such means comprises a pair of upper and lower plates 89 and 90 secured together in spaced relation and having alined impression openings 91 and 92, respectively, (Figs. 9 and 10) properly dimensioned and located to receive the imprintingly disposed impression roller face 56. The plates may be removably secured in position upon the table 28 by means of bolts 93 at their rear ends. The lower plate 90 is spaced from the top of the table sufficiently to permit passage thereunder of the label ribbon 29 or an envelope, card or other similar flat work upon which a stencil impression is to be made. The upper plate 89 serves as a shield and has the forward end portion thereof turned up in front of the impression roller to form a guard 94. Proper alinement of the stencil longitudinally of the impression roller is assured by the provision of vertical guide plates 95 at each side of the throatway between the forward end portions of the plates 89 and 90. Alinement of the stencil in a front to rear direction relative to the impression openings 91 and 92 may be determined by a stop 96 formed by turning up a portion of the lower plate 90 along the rear edges of the openings and adapted to be engaged by the top edge of the stencil.

A properly alined path for the label ribbon 29 under the impression roller 35 is defined by suitable means such as a pair of upstanding guide pins 97 at one side of the inker (at the right facing the machine as in Figs. 3 and 9) and a pair of upstanding guide pins 98 at the other side. Preferably, the guide pins 98 are located adjacent to the extreme ribbon-supply end of the table 28 on opposite sides of a pivotally mounted hold-down flap member 99 under which the ribbon passes as it is unwound from a spool 100 (Figs. 1 and 3). Suitable means for rotatably supporting the spool may comprise a pair of spaced parallel arms 101 projecting endwise from the table.

To avoid overrunning-slack, suitable tensioning means may be provided for the ribbon, preferably having a take-up of about one label section length. To this end, a horizontal roller 102 is mounted to traverse the path of the ribbon and the ribbon is looped thereunder before it reaches the table. The tensioning roller has an elongated axle 103 which projects at opposite ends through respective vertical slots 104 in a pair of parallel plates 105 which are secured to and depend from the outer faces of the inner ends of the arms 101. In addition to the weight of the roller 102, positive tension is created by resilient means such as a pair of suitable tension springs 107 which are respectively connected to the respective end portions of the axle 103 inside the plates 105. These springs are preferably of such length and elasticity as to enable movement of the roller 102 throughout the length of the slots 104. In view of limited space, the fixed extremities of the springs 107 are anchored by means such as pins 108 adjacent to the upper ends of the plates 105 and are looped around suitable trunnions 109 located adjacent the lower ends of the plates. As the springs 107 are expanded by upward pull upon the tensioning roller 102, their tension will, of course, increase and thereby tend to pull with increasing force against the roller 102 whereby to maintain the ribbon constantly under adjusted slack-preventing tension. If overrunning and slackening does occur in spite of the tensioning means, the hold-down member 99 will avoid buckling of the paper upon the feed end of the table.

Operation of the ribbon advancing means 31 is preferably correlated with the operation of the inker 30 to advance the ribbon 29 during the return stroke of the inker. With this end in view, the advancing means is located in spaced relation to the inker on the label-delivery side of the table and comprises a pair of upper and lower rollers 110 and 111 (Figs. 1, 3, 5 and 9) located on axes transverse to the path of the ribbon and having their peripheries cooperatively located to engage the upper and lower faces, respectively, of the interposed ribbon. The upper roller 110 is preferably tired with a resilient gripping surface 110ª such as rubber and is fixed upon ar xle 112 which is journaled at its opposite ends 'n bearing blocks 113. The journal blocks are mounted for axial adjustment within respective upwardly opening bores 114 in suitable upstanding bosses 115 on the table 28. Threaded into the bores 114 are flange nuts 117 each of which has a central bore 118. A stem nut 119 projects through each of the bores 118 and is threaded into the upper end of the respective journal block 115. Through this arrangement micrometer adjustment of the roller 110 may be effected simply by loosening the stem nuts 119, adjusting the flange nuts 117 and then tightening the stem nuts 119 to lock the journal blocks in adjusted position. Preferably, the stem nuts 119 are provided with axial oil ducts 120 through which oil may be delivered to the interiors of the journal blocks 113 for lubricating the ends of the axle 112.

The lower ribbon-feed roller 111 is preferably formed entirely of metal and projects peripherally through an opening 120ª in the table 28, being fixed upon a shaft 121 rotatably supported under the table. In the present instance approximately one-half of the periphery of the roller 111 is formed lower or on a shorter radius than the remainder of the periphery in order to provide a high or contact sector portion 111ª. Thereby, advancing engagement of the interposed ribbon 29 will be effected only during the interval when the contact sector portion 111ª is in rotary opposition to the upper roller 110 for pressing the ribbon against the gripping tire 110ª. The circumferential length of the contact sector portion 111ª is preferably equivalent to approximately one label length.

The ribbon feed rollers can be driven in unison through the medium of meshing gears 122 and 123 secured fixedly to the shafts 112 and 121, respectively, to complete one full revolution in synchronism with each cycle of operation of the inker 30. In such revolution of the rollers, the reduced radius portion of the lower roller periphery opposes the upper roller 110 during the imprinting stroke of the inker 30 while the contact sector portion 111ª becomes effective to press the ribbon against the gripping tire 110ª during the return stroke of the inker to advance the ribbon one label length.

Operation of the cut-off means 32 (Figs. 1, 3, 9 and 12) is preferably correlated with the inker 30 and the ribbon-advancing means 31 to receive the advancing ribbon during the return stroke of the inker and to sever the end label section from the ribbon substantially in synchronism with the imprinting stroke of the inker. Herein the cut-off means includes a stationary shear blade 127 which is mounted rigidly upon the inner vertical wall of a recess 128 formed in the adjacent label-delivery end of the table transversely of the path of the ribbon 29. Cooperating shearingly with the stationary blade is a movable knife or shear blade 129 which is pivotally mounted at one end under spring pressure upon a bracket 130 removably secured to a boss 131 that projects upwardly from the table 28. At its opposite end, the movable shear blade 129 is guided by a suitable fixed abutment member 132 which rises from the table. Shearing movement is imparted to the blade 129 by a pitman 133 which projects downwardly and has a follower 134 riding within a suitable cam groove 135 formed in a rotatable disk 137 that is mounted upon a rotary shaft 138 therefor. Through this arrangement each full rotation of the cam disk 137 will cause one shearing operation of the cut-off means. A guard 139 encloses the shearing portion of the movable shear blade 129 and has a flange 139ª which flares inwardly and upwardly from the lower inside edge thereof to facilitate feeding of the ribbon to the cut-off.

As the labels 33 are sheared off they drop into a receiving hopper 140 (Figs. 1, 3, 9 and 12) which is mounted upon a suitable bracket 141 attached to the adjacent end of the table 28. The receiving hopper is preferably located a sufficient distance below the top of the table 28 to permit the projecting end label portion of the ribbon to droop downwardly thereinto. In furtherance of this end it will be noted that the ribbon spool 100 is preferably mounted to feed the ribbon therefrom overhand so that the normal tendency of the end of the ribbon is to curl down, a tendency which persists in the label-extremity of the ribbon and assists in directing the same down into the stack in the hopper without riding up the rear wall of the hopper. It may also be noted that the periods of rest which elapse between the cut-off operations give time for quiescence of air in the hopper and thus avoid fluttering of the newly severed labels, the latter dropping off dead onto the stack.

Any tendency of the ribbon 29 to back-lash due to tension at the feeding end thereof, is avoided herein by anti-back-lash means 142 (Figs. 1, 3 and 9). This means includes a detent 143 which is pivotally mounted upon a suitable bracket 144 and is yieldably drawn toward the table 28 for engagement with the ribbon 29 by means of a tension spring 145 connected to one end of a bell crank lever 147. The upper end of the detent is formed as a latch 148 which bears against the adjacent leg of the bell crank lever and is adapted to engage lockingly within a recess 149 in such leg. Through this arrangement when it is desired to release the detent 143 as when feeding the ribbon 29 initially into position, it is merely necessary to raise the ribbon-engaging end of the detent by manipulating a handle pin 150 thereon until the latch end 148 snaps into the recess 149 as shown in broken outline in Fig. 9. To return the detent to its operative position, the bell crank lever is pivoted by raising the upper arm thereof (dot dash outline, Fig. 9) to release the latch end 148 from the locking recess. Preferably, the releasing arm of the bell crank lever is located above the adjacent arm 37 of the inker carriage and the relationship is such that when the carriage is in its extreme uppermost position during the return stroke, and before dropping to initial position, the releasing arm will be contacted to swing the bell crank lever and positively release the detent for ribbon-holding operation. As a result, it is impossible for the detent to remain inoperative during the operation of the machine and the consequences of back-lash are thus consistently avoided.

Suitable means is provided for driving all of the operating mechanisms of the machine coordinately either manually or by power. For manual operation, a suitable crank 47ª may be applied to one end of the cam shaft 47 (Fig. 6). Upon rotation of the shaft 47 a bevel pinion 151 fixed thereto drives a bevel gear 152 which in turn drives a bevel pinion 153 secured to the end of the ribbon-advancing roller shaft 121. Upon the latter shaft is secured a gear 154 which meshes with a pinion 155 fast upon the cut-off drive shaft 138. Through this arrangement each complete rotation of the shaft 47 will effect a coordinated cycle of operation of the inker 30, the feeding roll mechanism 31 and the cut-off 32.

Generally, however, the machine will be power driven for high speed operation by suitable means such as a light electric motor 157 which may be mounted as a driving unit under the rear portion of the table 28 together with a suitable transmission and operation-controlling mechanism carried within a housing 158 under the bevel gear drive assembly. The transmission and control mechanism is preferably a unit of the general type covered in Wheelbarger Patent No. 1,851,267 issued March 29, 1932, and includes a motor controlling switch 159 and transmission and controlling means of the one-revolution clutch type, generally indicated by the numeral 160 (Fig. 14). Through this means power is transmitted from the motor to a gear chain 161 for driving the bevel gear 152. Herein the motor switch 159 and the transmission and clutch means 160 are operatively synchronized through the medium of suitable mechanism generally identified at 162 which is adapted to be operated by a suitable push rod 163 that extends in a generally front to rear direction under the table 28 and has a suitably proportioned bar-headed push button 164 (Figs. 1, 3 and 6) at the front end thereof. The shank of the push button projects through and is supported by a flange 165 at the front of the table preferably in centered relation below the stencil locating plate 90 so that the push button can be pressed as an incident to placing a stencil in the imprinting position and by the same hand that carries the stencil card. Suitable means such as a contractile tension spring 166 serves to hold the push rod 163 normally in the nonoperating or forwardly projecting position limited by a pin 167 which is fast on the inner part of the push button shank to engage the flange 165.

At its rear end the push rod is pivotally connected to the operation-synchronizing mechanism 162 through the medium of a crank arm 168 which is fast upon one end of an operating shaft 169 journaled in a suitable bearing bracket 170. At its opposite end the shaft 169 carries a crank arm 171 (Fig. 16) which has a lost motion connection with a link 172 that is pivotally connected adjacent to one end of a trigger lever 173. A tension spring 174 for holding the trigger in loaded position engages a heel 175 adjacent to the opposite or pivoted end thereof. Intermediate its ends, the trigger lever 173 has a notch 177 for engaging the end of a pivotally mounted trip lever 178 in such a relationship as to hold the switch 159 open by engagement with a movable switch contact element 179. Upon pushing the button 164 inwardly the push rod 163 actuates the associated crank end linkage means and springs the trigger 173 (Fig. 17) so that a contractile tension spring 180 may draw the trip lever 178 out of the notch 177 and release the switch element 179. This closes the switch 159 by closing an electrical circuit through a pair of contact points 181 and effects operation of the driving motor 157.

Simultaneously with closing of the switch 159, the trip lever 178 acts to release a spring-tensioned detent member 182 from a catch 183 which is mounted upon a disk 184 rigid with a hub 185 pinned to a shaft 187. Release of the catch 183 serves to release a pawl 188 controlled thereby and which thereupon engages a tooth of a ratchet 189 that is formed integral with the hub of a worm gear 190 normally freely rotatable about the shaft 187 (Fig. 18). The worm gear 190 meshes with a worm 191 (Figs. 14 and 15) upon the drive shaft of the motor 157.

Figure 19:
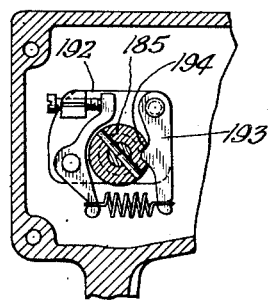
Fig. 19 is a fragmentary horizontal sectional view taken substantially in the plane of line 19—19 of Fig. 14.

Rotation of the disk 184 by the recited connection with the worm gear 190 effects rotation of a disk 192 through the medium of an adjustably spring-tensioned overload release pawl 193 (Fig. 19) mounted thereon and having a releasable engagement with a notch 194 in the hub 185. A hub 195 (Fig. 18) upon the disk 192 serves as a bearing for one end of the shaft 187 and also has one member of the chain of gears 161 fixed thereon.

After one complete driving revolution of the transmission mechanism the driving connection is disabled by the action of a trip finger 197 which engages a cam finger 198 upon the adjacent end of the trip lever 178 and rocks the lever until the opposite end thereof again enters the trigger notch 177 to reset the trigger. This throws the detent member 182 again into the path of the catch 183 for moving the latter into releasing engagement with the pawl 188 and for positively halting the machine at the end of the operating cycle. Simultaneously with disablement of the transmission, the switch 159 is opened, to deenergize the motor 157 which may coast to a stop.

Manual operation of the clutch and transmission mechanism 160 may be effected as for adjustment purposes by applying a crank (not shown) to a suitably notched hub 199 which forms a bearing for the lower end of the shaft 187 and has rigid therewith a disk 200 (Figs. 14, 15 and 18) carrying a spring urged pawl 201 for engaging a notch 202 within a collar 203 pinned to the shaft.

A complete cycle of power operation of the machine will now be described:

Assuming the machine to be at rest with the inker 30 poised at the starting position, and with the label ribbon 29 in place to be imprinted, the user inserts the stencil portion 26 of one of the record cards 25 between the locating plates 89 and 90 and in the same movement pushes the starting button 164. This starts the motor 157 and vitalizes the clutch and transmission mechanism 160, thereby causing the cam disk shaft 47, the paper feed shaft 121 and the shear-actuating shaft 138 to be driven at high speed. This causes the inker 30 to be rocked practically instantaneously for impressing the roller 35 against the stencil and for advancing the ink distributor 59. Substantially simultaneously, the shear blade 129 operates to sever the endmost label section 33 from the ribbon 29. Then almost without hesitation the inker 30 is raised and the impression roller 35 advanced to bring another impression face 55 thereof into operative position and to rotate the inking roller 57 and the transfer roller 58. While the inker is rising, the paper feed rollers 110 and 111 operate to advance the label ribbon 29 one label length, thereby presenting a blank section under the inker for receiving the next imprint and projecting the endmost imprinted section through the cut-off 32 to extend into the hopper 140. Thereupon the machine comes to a dead stop ready for another cycle of operation. While the inker 30 is at its highest position, before dropping to the starting position, it will positively release the paper holding detent 143, should the latter have been retracted before the beginning of the cycle of operation. The same cycle of operation may, of course, be effected after the starting button 164 has been pushed, by driving the machine through the medium of the hand crank. In practice it has been found that when power operated the machine is capable of operating at a greater speed than a skilled user can work in selecting and feeding the stencils thereto.

By having the relatively large space upon the table 28 at the ribbon-feed side of the inker 30, envelopes and similar flat mailing articles may conveniently be inserted under the locating plate 90 beneath the inker to have addresses stenciled thereon. By having the space below such area of the table free of obstructing mechanism (see Fig. 3), provision is made for the convenient reception thereunder of the ends of filing boxes with which the user may be working. Moreover, the space upon the table between the inker 30 and the ribbon advancing roller means 31 is of sufficient length to render the last-imprinted label to be freely examined by the user so that should the label be poorly imprinted as where the stencil has become clogged or improperly positioned, a reprint can be made at once while the stencil is still in hand.

Figure 20:
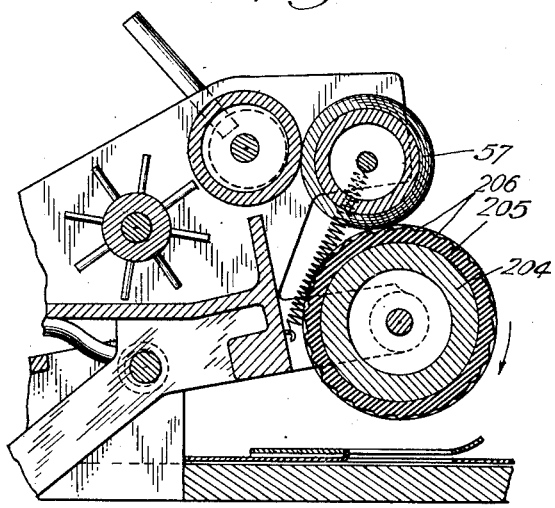
Fig. 20 is a fragmentary vertical sectional view through a slightly modified form of inking mechanism.
Figure 21:
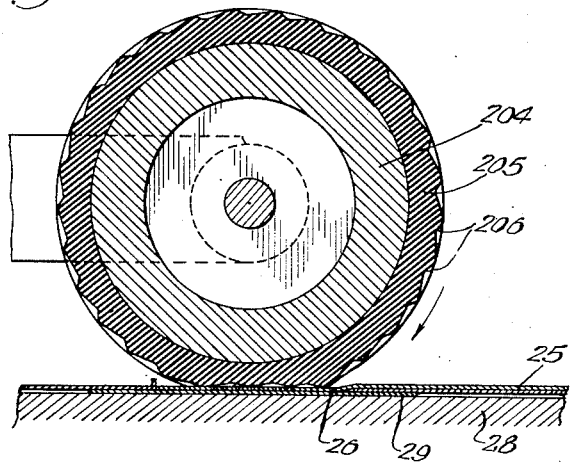
Fig. 21 is an enlarged vertical sectional view of the impression roller shown in Fig. 20.

A modified form of impression roller 204, as shown in Figs. 20 and 21, may be used in place of the previously described impression roller 35. The modified roller has an annular peripheral rubber covering 205 containing closely spaced pits 206 for receiving minute quantities of ink from the inking roller 57 in addition to the coat of ink applied to the surface proper of the impression roller. The pits 206 are preferably elongated circumferentially of the roller and have the deepest portions thereof adjacent to their trailing ends as the roller rotates. Tangential sand-blasting of the rubber covering 205 has been found to be a convenient manner of forming the pits. This pitted arrangement has been found to assure filling of the pits with ink when passing the inking roller 57. Then, upon the impression of the roller 204 against one of the stencils 26, the flattening and spreading of the rubber covering 205 (Fig. 21) effects a resultant opening or spreading of the pits 206 and distribution of the ink therefrom over the increased area covered by the flattened rubber. As a result a greater uniformity of ink distribution over the work is obtained than is possible with a smooth-surfaced annular roller.

From the foregoing it will be apparent that the present invention provides an addressing machine which is simple to operate and is capable of functioning at high speed to produce a large volume of stenciled labels uniformly and accurately. The improved inking mechanism insures proper, uniform inking of the stencils and the coordinated ribbon advancing and cut-off mechanisms operate smoothly and efficiently in conjunction with the inker. In addition, the one-revolution cyclical, manual or power actuated, driving mechanism enables operation at high speed and with a low power input. For example, in practice a one-twelfth horsepower motor has been found to provide more than ample power and even lighter motors have been employed satisfactorily. Moreover, the machine is capable of use not only to produce labels but may also be employed to stencil-address envelopes or other flat work.

I claim as my invention:

1. A machine for stencil-imprinting addresses or the like comprising, in combination, means for supporting work to receive a stencil impression, means for locating a stencil in imprinting position with respect to the work, means for impressing ink through the located stencil including an impression roller and a carriage therefor, means for actuating said carriage to carry said impression roller toward and away from the stencil, means supported by said carriage for inking said impression roller, and means operable as a result of movements of said carriage to provide said inking means with ink.

2. An addressing machine comprising, in combination, a table, an inker including a carriage rockably supported by said table and, having a rocker arm, means coacting with said rocker arm to actuate said carriage for movements toward and away from said table, an impression roller carried by said carriage to be impressed against said table, means for alining a stencil between said table and said impression roller, means on said carriage for supplying ink to said impression roller including an inkwell and a rotary distributor having radial pins dipping thereinto, a transfer roller for receiving ink from the ends of said pins, an inking roller bearing against both said transfer roller and said impression roller and having an absorbent face for capillary spreading of the ink therethrough, means supported by said table for rotating said distributor as an incident to movement of said carriage toward said table, and means for rotating said impression roller as an incident to movement of said carriage away from said table.

3. In a stencil-imprinting machine of the character described, in combination, an inker including a carriage having an impression roller, an inkwell on said carriage, a rotary distributor having rows of radial distributor pins and mounted so that said pins will dip into ink within said well, a transfer roller mounted with its periphery in such spaced relation to the orbit of movement of the tips of said pins as to receive spots of ink from beads collected on the pin ends, a rotatable inking roller bearing against said transfer roller and said impression roller and having an absorbent covering for diffusion of the ink spots received from said transfer roller, means for relatively rotating said rollers and said distributor, means for supporting a stencil and work to receive an impression from said impression roller, and means for actuating said inker cyclically through impression and return strokes.

4. In a machine adapted for stencil-imprinting addresses or the like, in combination, means for supporting a stencil and work to be imprinted, a movable carriage including a rotatable impression roller to impress ink against the stencil, means for supplying ink to said impresison roller including an ink transfer roller and an inking roller bearing against both said transfer roller and said impression roller, said inking roller having a covering comprising a plurality of layers of cotton cloth adapted to have the ink uniformly distributed therethrough by capillarity, means for rotating said rollers, and means for actuating said carriage.

5. An inking roller adapted for use in a stencil-imprinting machine, including a core, and a plurality of layers of cotton cloth wrapped about said core to provide an ink retaining and spreading periphery for the roller.

6. A machine of the character described comprising, in combination, means for supplying a label ribbon to be imprinted, means for advancing said ribbon step-by-step including a pair of cooperative rollers, one of said rollers being fashioned to enter into ribbon gripping and advancing relation with the other roller during only a partial revolution, and means for supporting one of said rollers adjustably including journal blocks having stem nuts threaded thereinto and lockingly engageable with adjustably mounted flange nuts in support thereof.

7. A machine of the character described comprising, in combination, a table, an inker movably mounted on said table, means for locating a manually loaded stencil in alinement under said inker, means for actuating said inker cyclically including controlling mechanism, and means for operating said controlling mechanism including a movable member mounted upon said table in such relation adjacent to said stencil-locating means that actuation of said member can be effected simultaneously as a stencil is loaded thereinto and by the same hand in which the stencil is held in the loading process.

8. For use in a machine of the character described, an annular roller for impressing ink upon a work object, said roller including peripherally formed pits elongated circumferentially and having their greatest depth at their trailing ends.

9. In combination in a machine for making stenciled impressions from manually fed stencil cards which have a stencil portion at one end of a record body, a support for the work to be imprinted, means opening toward the position occupied by the person operating the machine for receiving and determining the proper position for the stencil portion of a selected one of the stencil cards in superposed printing relation to the work while leaving the record body free for manipulation, means for impressing ink through the positioned stencil portion onto the work, and selectively operable means for actuating said ink-impressing means.

10. In combination in a machine for making stencil impressions from manually fed stencil cards which have a stencil portion at one end of a record body, a table for supporting the work to be imprinted, stencil positioning means near one edge of the table arranged to receive the stencil portion of a selected stencil card by a feeding movement inwardly from said table edge and to position such stencil portion in proper superposed printing relation to the work on the table, means movably mounted above said positioning means for impressing ink through the stencil portion onto the work, means for actuating said ink-impressing means, and means for controlling the operation of said actuating means including a control member located at said edge of the table in a position to be engaged by the same hand as feeds the stencil card to said positioning means and substantially coincident with the end of the stencil feeding movement.

11. In combination in a machine for making stencil impressions from the stencil end portions of record cards, a work support, means for impressing ink onto the work, and means on said work support interposed between said ink-impressing means and the work for positioning the stencil end portions in superposed relation to the work and providing a throatway opening toward the front of the machine to facilitate manual insertion of the stencil portions thereinto.

12. In combination in a machine for imprinting through stencils, a work support, means for positioning a stencil in printing relation to work on said support, imprinting means including an ink-bearing impression roller and a movable carriage rotatably supporting said roller, means for driving said carriage to carry said roller through a short and quick impression stroke from a starting position relatively close to the stencil position and a long return stroke in which the roller attains a position substantially beyond said starting position and then comes back to said starting position, and means operative in said return stroke for rotatively advancing said roller incrementally to present a succeeding portion of the impression surface of the roller for impressing the stencil.

13. In combination with a machine of the character described for imprinting through the stencil portions at one end of hand-manipulated record cards and including a work support and ink applying means mounted above said support for selective reciprocal movement toward engagement with the work and return to nonengaging position, a guide member upon said support under said ink applying means having a throatway opening toward the front of the machine for receiving the stencil portions of successive record cards manually inserted thereinto but leaving the record portions of the cards free to be held in hand for withdrawal after imprinting, a stop at the rear of said throatway, and guides at the sides of said throatway cooperating to locate said stencil portions in alinement with said ink applying means, said guide member being open above and below the area of said stencil portions to be inked and supporting said stencil portions in spaced relation above said support so that the work to be stenciled can be inserted thereunder.

14. In combination with a machine of the character described for imprinting through the stencil portions at one end of hand-manipulated record cards and including a work support and ink applying means thereabove for selective reciprocal movement toward engagement with work on said support, a guide member upon said support under said ink applying means for supporting the stencil portions in spaced relation above the work to be imprinted and having a throatway opening toward the front of the machine for receiving the stencil portions of successive record cards while leaving the record portions of the cards free to be held in hand for withdrawal after imprinting, single cycle operating means for said ink applying means, and means for controlling said operating means including a rearwardly movable operating member located at the front of said support below the opening to said throatway and close enough thereto to be moved for initiating a cycle of operation of the ink applying means substantially coincident with insertion of the stencil portion of a card into said throatway and by the same hand in which the card is held during such insertion.

15. A compact small size addressing machine of the character described comprising as a self-contained portable unit, in combination: a table adapted to be supported upon a work bench or the like at a convenient height and location for an operator to sit in front and manually feed into the machine the stencil end portions of successive selected record cards from a file box into which the cards are returned after use, means mounted upon said table to receive thereunder work to be imprinted and opening toward the front of the table to receive and position the stencil end portions of the cards in superposed relation to the work, means movably mounted at the rear of the table and including a member for impressing ink onto the work through the stencil end portions in said positioning means; means for actuating said ink impressing means mounted on the underside of said table, and means for controlling said actuating means including a one-revolution clutch mechanism for halting said actuating means after each cycle of operation and having a control member including an actuating rod and a push button located at the front of the table arranged to be actuated at will to set the clutch mechanism for a cycle of operation.

16. In combination with a machine for making stencil impressions, including a work table and an inking mechanism mounted for reciprocal movement toward and away from said table in ink impressing and return strokes, said mechanism including a carriage and an impression roller, means at one end of said roller engageable for rotating the roller, a member movably supported by said carriage and biased for normal engagement with said engageable means for holding said roller against rotation, and catch means movably mounted upon said table biased for normal engagement with said engageable means to operate in the return stroke of said inking mechanism to rotate said roller incrementally for presenting a succeeding portion of its periphery for impression on the succeeding ink impressing stroke, said catch means being engageable with said holding member on the ink impressing stroke of said mechanism for releasing said holding member from said engageable means and being adapted to maintain the released condition until the roller has been incrementally rotated.

17. In combination with a machine for making stencil impressions and including a work table and an inking mechanism mounted for reciprocal movement toward and away from said table in ink impressing and return strokes, said mechanism including a carriage and an impression roller, said impression roller having a uniform series of generally flat peripheral impression faces, a cog wheel at one end of said roller engageable for rotating the roller, a lever mounted on said carriage for normally engaging a cog of said wheel to hold the roller against rotation with a selected flat face in ink impressing position, a catch member movably mounted upon said table and biased toward said cog wheel for engaging another cog to rotate said roller incrementally during the return stroke of said inking mechanism for moving a succeeding flat face into ink impressing position, and means cooperating with said lever and said catch member during the ink impressing stroke of said mechanism to release said catch from the cog wheel and operating during the return stroke of said mechanism to release said lever from the cog wheel.

18. In combination with a machine for making stencil impressions including a work table and an inking roller mounted for reciprocal movement toward and away from said table in ink impressing and return strokes, means for driving said inking roller through a continuous cycle of operation commencing with an impression stroke starting from a position wherein the roller is relatively close to the table and terminating with a return stroke including a first part carrying the roller away from the table substantially beyond the starting position and a second part moving the roller back to the starting position, means operative during the impression stroke to hold the roller against rotation, and means operative during the first part of the return stroke to release said holding means and rotate said roller by predetermined increments, said releasing and rotating means disengaging from said holding means at substantially the end of said first part of the return stroke and becoming at least partially prepared during the second part of the return stroke to repeat its releasing and rotating performance.

19. In combination with an imprinting machine of the character described including a work table, means for impressing ink through a stencil onto work supported by said table comprising a rotatable impression roller and a carriage for said roller, said carriage being rockably mounted upon said table and having a rocker arm projecting rearwardly therefrom, a rotatably driven cam member associated with and arranged to actuate said arm to rock said carriage in an impression stroke to carry said roller into imprinting relation to the stencil from an initial position relatively close to said table and then in a smooth transition rock the carriage in a return stroke in the first part of which the impression roller is carried substantially above the initial position of the table and in the second part of which the roller is returned to said initial position, and means operative during the first part of said return stroke to rotate said roller incrementally to present a succeeding peripheral portion thereof toward said table.

20. In combination with an addressing machine of the character described including a work support, means for imprinting work upon said support by means of ink pressed through a stencil and including a carriage mounted for movement in an imprinting stroke toward the work support and a return stroke away from the support, means for driving said carriage cyclically, a rotatable impression roller and an ink reservoir substantially spaced from said roller both supported by said carriage, an ink distributing roller rotatably mounted on said carriage and including a plurality of radial pins arranged to dip into said reservoir, roller means for receiving spots of ink from said pins and for transferring the ink to said impression roller arranged to be rotated by rotation of said impression roller, means operative during the imprinting stroke of the imprinting means to rotate said distributing roller incrementally for advancing the pins which dip into the reservoir out of the ink into distributing relation to said transferring roller means, and means operative during the return stroke of the imprinting means for rotating said impression roller incrementally and thereby said transferring roller means.

21. In combination with a machine for stenciling addresses and including a work support, means for impressing ink through a stencil onto work on said support including a carriage reciprocable toward and away from said support and having a rotatable impression roller, an ink reservoir on said carriage, a rotary member supported by said carriage and including a series of longitudinal rows of radial blunt end pins arranged to dip into relatively viscous stenciling ink within said reservoir, means for rotating said member incrementally to cause the rows of said pins to sweep through the ink successively, means for transferring the ink from said pins to said impression roller including a relatively smooth surface roller mounted with its periphery in such spaced relation to the blunt ends of said pins that only beads of ink adhering to said ends will contact said smooth surface roller as said pins sweep thereby whereby to deposit spaced spots of ink on the surface of such roller, and means for adjusting the spacing between said pin ends and said smooth surface roller as required by variations in viscosity of the ink so that only a proper amount of ink will carry over from said beads.

22. In combination with a stencil imprinted machine including a work support, means for impressing ink through a stencil onto work on said support including a cylindrical rubbery surfaced rotatable impression roller, and an inking roller arranged to roll in peripheral contact with said impression roller, means for incrementally rotating said impression roller to advance succeeding peripheral portions into position opposite the stencil, and means for carrying said impression roller into ink impressing engagement with the stencil after the incremental advance and with sufficient force to substantially flatten the opposed peripheral portion of the roller against the stencil, said peripheral portions having a well-distributed series of circumferentially elongated ink pits therein formed with the greatest depth at their trailing ends considered with respect to the direction of relative rotation of the impression and inking rollers so that ink will be positively forced into said pits from the inking roller, said pits being adapted to be substantially flattened out to deposit the ink contained therein when said peripheral portions are flattened against the stencil.

23. In combination with an addressing machine including a table and a reciprocating device for pressing ink through a stencil placed between such device and the table, means at one side of the table for supporting a roll of strip material to be imprinted, means on the opposite side of the table for periodically gripping and drawing the strip of material from the roll across the table to advance and locate successive portions of the strip under said device and then releasing the strip, means adjacent to said roll support for tensioning the strip to avoid slack from overrunning of the roll, means located between said drawing means and said device for preventing backlash of the strip due to the action of said tensioning means in the intervals when the strip is released by said drawing means, said back-lash preventing means including a movable detent biased for engagement with the strip to prevent return movement of the strip but permitting free advancing movement thereof, and a member selectively engageable with the detent for holding the detent inoperative during manual adjustment of the strip as when initially feeding the strip through the machine, said member being arranged to be manually released from said detent and being so located relative to said device that in the reciprocations of the latter during operation of the machine said member will be released if not already manually released.

HURLEY D. RALSTON.